Aug. 2, 1960     W. C. JOHNSON     2,947,051
LINE TIGHTENER
Filed Dec. 30, 1957

INVENTOR.
WARREN C. JOHNSON
BY
ATTORNEY

United States Patent Office 2,947,051
Patented Aug. 2, 1960

2,947,051
LINE TIGHTENER
Warren C. Johnson, Willway Road, Wayne, Ill.

Filed Dec. 30, 1957, Ser. No. 705,955

14 Claims. (Cl. 24—129)

This invention relates to a line tightener for use with clothes-lines, tennis court ropes and the like.

I am aware that numerous constructions have been proposed for line tighteners, but most of these have not been satisfactory for one reason or another and have not been successful commercially. Evidently the main objection to the earlier designs has been their inability to prevent slippage, and it is accordingly the principal object of my invention to provide a line tightener so designed and constructed as to positively minimize the likelihood of slippage, this objective being achieved by a combination of the following features:

(1) A wedging action on the line where two lengths extend through dovetail-shaped openings in the body of the line tightener, so that the rope is not only pinched at the points of entry and exit but the two lengths are pressed together into close rubbing contact between these two points to further resist any relative movement and prevent slippage.

(2) Combined with the wedging action, increased frictional resistance is provided on the roughened crown-shaped surface of the body between the two dovetail-shaped openings over which the rope extends and against which it is drawn tightly.

(3) Combined with features 1 and 2 is the provision of a transverse groove between two additional narrower dovetail-shaped openings through which the dead end portion of the rope is entered to clinch it, the same being not only pinched in the dovetail-shaped openings but also gripped between these two points by the crossing over of the tightly drawn two lengths extending between the other pair of openings, the abrupt change in direction where the rope extends from one of the other pair of openings to one of the narrower dovetail-shaped openings giving further definite assurance against any likelihood of slippage.

The invention is illustrated in the accompanying drawing, in which—

Figure 1:
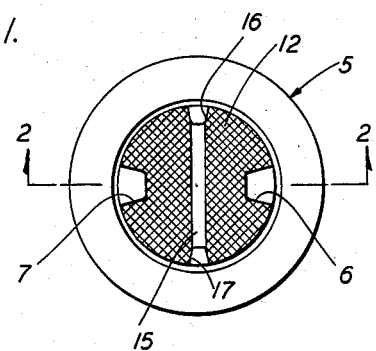
Figure 2:
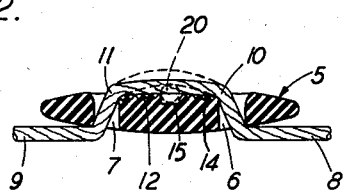
Figure 4:
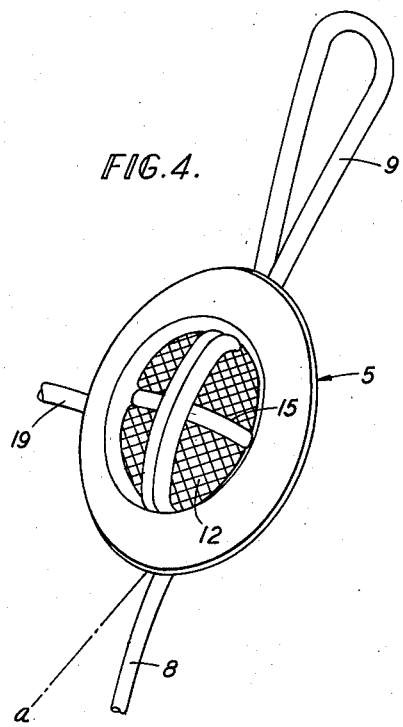
Figure 3:
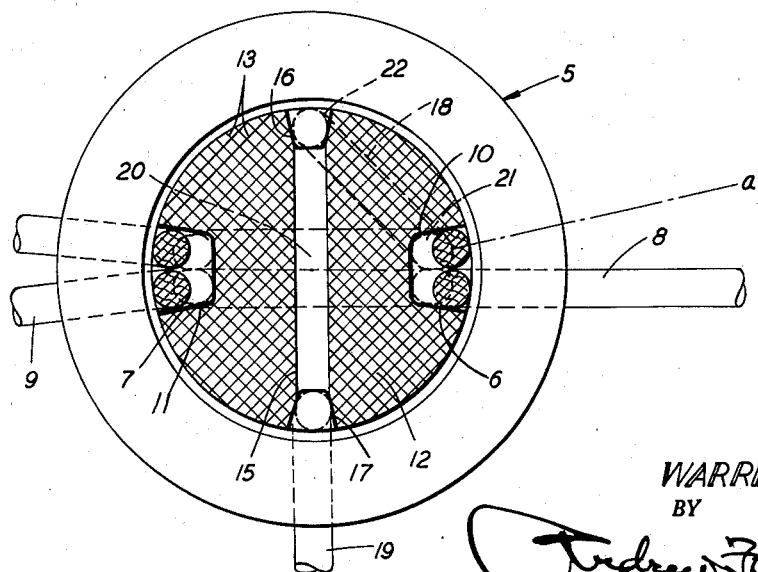

Fig. 1 is a face view of a line tightener made in accordance with my invention, and Fig. 2 is a section on the line 2—2 of Fig. 1, showing a length of rope extending through the larger dovetail-shaped openings to illustrate one way in which the device is adapted to be used, there being shown in dotted lines a circle in the transversely extending groove to indicate where the dead end portion of the rope lies and is adapted to be clinched when the tightener is used in the manner illustrated in Figs. 3 and 4, Fig. 3 being an enlargement of Fig. 1 and Fig. 4 being a perspective view.

The same reference numerals are applied to corresponding parts throughout the views.

Referring to the drawing, the line tightener of my invention is indicated generally by the reference numeral 5, and preferably, though not necessarily, is in the form of a circular disk or button of molded plastic material having two diametrically opposed, parallel, dovetail-shaped openings 6 and 7 provided therein which taper inwardly toward each other and are wide enough at their radially outer portions to accommodate fairly freely two lengths of rope, like that indicated at 8, side by side so that the rope may be threaded in through opening 6 and out through opening 7 and formed into a loop, as indicated at 9, to engage on a hook or the like, the other end of the loop being extended back into the opening 7 and out through the opening 6, the inward taper of the openings 6 and 7 being relied upon to obtain a tight wedging action at the points 10 and 11 where the rope makes sharp bends as it extends across the crowned or spheroidal-shaped face 12 of the body between the openings 6 and 7, as illustrated in Fig. 2, and as also indicated by the dotted line circles in Fig. 3. The surface 12 is serrated on 45° lines, as indicated at 13 in Fig. 3, with respect to the direction of the rope 8 where it extends between the openings 6 and 7, whereby to provide the saw-teeth projections indicated at 14 in Fig. 2, which by tight engagement of the rope under tension can be counted upon to give considerable additional frictional resistance to any relative movement between the rope and the body of the line tightener. The pinching action on the rope at 10 and 11 also insures tight interengagement of the oppositely extending lengths of rope between the openings 6 and 7 to further resist any relative movement.

In operation, a line tightener of satisfactory form may be made, embodying just the features described this far, namely:

(1) The dovetail-shaped openings 6 and 7;
(2) The crowned or spheroidal-shaped surface 12 between the openings 6 and 7, and
(3) The serrations 13—14 on 45° lines with respect to the direction of the two pieces of rope provided on the surface 12.

The rope 8 or other line to be maintained under tension will, it is understood, be extended in through opening 6, across and down through opening 7 and out to define the loop 9, and then in through opening 7 across and down through opening 6 and out along the dot and dash line a as indicated in Figs. 3 and 4, there being ample insurance against slippage afforded by the pinching of the line at 10 and 11 where the two oppositely extending lengths are crowded together at the inner ends of the dovetail-shaped openings 6 and 7, and there being further insurance against slippage afforded by the tight frictional engagement of the two parallel extending lengths between the openings 6 and 7, and by the tight engagement of these lengths with the crown-shaped and serrated surface 12 between the openings. However, I prefer to provide in addition the transversely extending groove 15 interconnecting the dovetail-shaped openings 16 and 17 so that the dead end portion of the rope that would otherwise extend out freely on the dot and dash line a may be extended abruptly from the opening 6 along a 45° line, as indicated at 18, and up through opening 16 and across the top of the body of the line tightener in groove 15 and down through opening 17 and out, as indicated at 19, the two lengths of rope extending between openings 6 and 7 crossing over and serving to clinch the dead end portion, as indicated in dotted lines at 20 in Fig. 2. The additional antislip feature afforded by the groove 15, which is shallow in relation to the cross-section of the rope to insure a good hold at the cross-over points 20, coupled with the abrupt changes in direction at 21 and 22 and the pinching of the rope at 16 and 17 is enough to eliminate any likelihood of slippage if only ordinary care is taken in the proper use of the line tightener. It will also be understood that the narrower openings 16 and 17 can be used with plastic line and rope of smaller cross-section where these openings are wide enough to give a wedging action on two oppositely extending lengths similarly as shown in openings 6 and 7. Thus one device 5 may be used with two or more different sizes and kinds of rope or line.

It is believed the foregoing description conveys a good understanding of the objects and advantages of my invention. The appended claims have been drawn to cover all legitimate modifications and adaptations.

I claim:

1. In a device of the character described for securing against slippage the free end of a rope loop, the combination with a rope of substantially uniform thickness having a loop formed in one end portion thereof from which extends a free end portion, a disc body having a pair of diametrically opposed elongated rope-receiving openings extending therethrough in substantially parallel relation and perpendicular to the plane of the body, the openings being tapered toward one another and both being of a width in relation to the thickness of said rope for close confinement and wedging engagement in the narrower inner ends of both of said openings of side by side abutting live and dead lengths of the rope in the inner ends thereof, said rope being extended through said openings and formed in a loop and its dead end portion being extended back through the openings alongside its live end portion to define the abutting lengths, both lengths of said rope between the openings being disposed in a plane parallel to and abutting the surface of the body of said disc, and the live end being placed under tension while the loop is suitably anchored.

2. The combination as set forth in claim 1 wherein the body of said disc has a crown formation on the surface thereof between said openings engaged by the abutting lengths of rope, whereby to increase the resistance to slippage of the rope under tension.

3. The combination as set forth in claim 1 wherein the body of said disc has roughnesses on the surface thereof between said openings engaged by the abutting lengths of rope, whereby to increase the resistance to slippage of the rope under tension.

4. The combination as set forth in claim 1 wherein the body of said disc has a crown formation and roughnesses on the surface thereof between said openings engaged by the abutting lengths of rope, whereby to increase the resistance to slippage of the rope under tension.

5. In a device of the character described for securing against slippage the free end of a rope loop, the combination with a rope of substantially uniform thickness having a loop formed in one end portion thereof from which extends a free end portion, a disc body having a pair of diametrically opposed elongated rope-receiving openings extending therethrough in substantially parallel relation and perpendicular to the plane of the body, the openings being tapered toward one another and both being of a width in relation to the thickness of said rope for close confinement and wedging engagement in the narrower inner ends of both of said openings of side by side abutting live and dead lengths of the rope in the inner ends thereof, said rope being extended through said openings and formed in a loop and its dead end portion being extended back through the openings alongside its live end portion to define the abutting lengths, both lengths of said rope between the openings being disposed in a plane substantially parallel to the surface of the body of said disc, and the live end being placed under tension while the loop is suitably anchored, said body having two other smaller width diametrically opposed rope-receiving openings extending therethrough in substantially parallel relation and perpendicular to the plane of the body and located on a line in transverse relationship to a line through the first mentioned openings, whereby the dead end portion of the rope may be extended for clinching purposes through these additional openings under the two lengths of rope between the first mentioned openings.

6. In a device of the character described for securing against slippage the free end of a rope loop, the combination with a rope of substantially uniform thickness having a loop formed in one end portion thereof from which extends a free end portion, a disc body having a pair of diametrically opposed elongated rope-receiving openings extending therethrough in substantially parallel relation and perpendicular to the plane of the body, the openings being tapered toward one another and both being of a width in relation to the thickness of said rope for wedging engagement of side by side abutting live and dead lengths of the rope in the inner ends thereof, said rope being extended through said openings and formed in a loop and its dead end portion being extended back through the openings alongside its live end portion to define the abutting lengths, and the live end being placed under tension while the loop is suitably anchored, said body having two other smaller width diametrically opposed rope-receiving openings extending therethrough in substantially parallel relation and perpendicular to the plane of the body and located on a line in transverse relationship to a line through the first mentioned openings, whereby the dead end portion of the rope may be extended for clinching purposes through these additional openings under the two lengths of rope between the first mentioned openings, the body of said disc having a groove provided in the rope-engaged face thereof between the two additional openings, said groove being shallow in relation to the cross-sectional dimensions of the rope.

7. In a device of the character described for securing against slippage the free end of a rope loop, the combination with a rope of substantially uniform thickness having a loop formed in one end portion thereof from which extends a free end portion, a disc body having a pair of diametrically opposed elongated rope-receiving openings extending therethrough in substantially parallel relation and perpendicular to the plane of the body, the openings being tapered toward one another and both being of a width in relation to the thickness of said rope for wedging engagement of side by side abutting live and dead lengths of the rope in the inner ends thereof, said rope being extended through said openings and formed in a loop and its dead end portion being extended back through the openings alongside its live end portion to define the abutting lengths, and the live end being placed under tension while the loop is suitably anchored, said body having two other smaller width diametrically opposed rope-receiving openings extending therethrough in substantially parallel relation and perpendicular to the plane of the body and located on a line in transverse relationship to a line through the first mentioned openings, whereby the dead end portion of the rope may be extended for clinching purposes through these additional openings under the two lengths of rope between the first mentioned openings, the two additional openings being also tapered toward one another for wedging engagement of the dead end portion of the rope therein when pulled tight.

8. In a device of the character described for securing against slippage the free end of a rope loop, the combination with a rope of substantially uniform thickness having a loop formed in one end portion thereof from which extends a free end portion, a disc body having a pair of diametrically opposed elongated rope-receiving openings extending therethrough in substantially parallel relation and perpendicular to the plane of the body, the openings being tapered toward one another and both being of a width in relation to the thickness of said rope for wedging engagement of side by side abutting live and dead lengths of the rope in the inner ends thereof, said rope being extended through said openings and formed in a loop and its dead end portion being extended back through the openings alongside its live end portion to define the abutting lengths, and the live end being placed under tension while the loop is suitably anchored, said body having two other smaller width diametrically opposed rope-receiving openings extending therethrough in substantially parallel relation and perpendicular to the plane of the body and located on a line in transverse relationship to a line through the first mentioned openings, whereby the dead end portion of the rope may be extended for clinching purposes through these additional openings under the two lengths of rope between the first mentioned openings, the two additional openings being also tapered toward one another for wedging engagement of the dead end portion of the rope therein when pulled tight, said body also having a groove provided in the rope-engaged face thereof between the two additional openings, said groove being shallow in relation to the cross-sectional dimensions of the rope.

9. In a device of the character described for securing against slippage the free end of a rope loop, the combination with a rope of substantially uniform thickness having a loop formed in one end portion thereof from which extends a free end portion, a disc body having a pair of diametrically opposed elongated rope-receiving openings extending therethrough in substantially parallel relation and perpendicular to the plane of the body, the openings being tapered toward one another and both being of a width in relation to the thickness of said rope for wedging engagement of side by side abutting live and dead lengths of the rope in the inner ends thereof, said rope being extended through said openings and formed in a loop and its dead end portion being extended back through the openings alongside its live end portion to define the abutting lengths, and the live end being placed under tension while the loop is suitably anchored, said body having two other smaller width diametrically opposed rope-receiving openings extending therethrough in substantially parallel relation and perpendicular to the plane of the body and located on a line in transverse relationship to a line through the first mentioned openings, whereby the dead end portion of the rope may be extended for clinching purposes through these additional openings under the two lengths of rope between the first mentioned openings, the body of said disc having a crown formation on the surface thereof between said first mentioned openings engaged by the abutting lengths of rope, whereby to increase the resistance to slippage of the rope under tension.

10. In a device of the character described for securing against slippage the free end of a rope loop, the combination with a rope of substantially uniform thickness having a loop formed in one end portion thereof from which extends a free end portion, a disc body having a pair of diametrically opposed elongated rope-receiving openings extending therethrough in substantially parallel relation and perpendicular to the plane of the body, the openings being tapered toward one another and both being of a width in relation to the thickness of said rope for wedging engagement of side by side abutting live and dead lengths of the rope in the inner ends thereof, said rope being extended through said openings and formed in a loop and its dead end portion being extended back through the openings alongside its live end portion to define the abutting lengths, and the live end being placed under tension while the loop is suitably anchored, said body having two other smaller width diametrically opposed rope-receiving openings extending therethrough in substantially parallel relation and perpendicular to the plane of the body and located on a line in transverse relationship to a line through the first mentioned openings, whereby the dead end portion of the rope may be extended for clinching purposes through these additional openings under the two lengths of rope between the first mentioned openings, the body of said disc having roughnesses on the surface thereof between said first mentioned openings engaged by the abutting lengths of rope, whereby to increase the resistance to slippage of the rope under tension.

11. In a device of the character described for securing against slippage the free end of a rope loop, the combination with a rope of substantially uniform thickness having a loop formed in one end portion thereof from which extends a free end portion, a disc body having a pair of diametrically opposed elongated rope-receiving openings extending therethrough in substantially parallel relation and perpendicular to the plane of the body, the openings being tapered toward one another and both being of a width in relation to the thickness of said rope for wedging engagement of side by side abutting live and dead lengths of the rope in the inner ends thereof, said rope being extended through said openings and formed in a loop and its dead end portion being extended back through the openings alongside its live end portion to define the abutting lengths, and the live end being placed under tension while the loop is suitably anchored, said body having two other smaller width diametrically opposed rope-receiving openings extending therethrough in substantially parallel relation and perpendicular to the plane of the body and located on a line in transverse relationship to a line through the first mentioned openings, whereby the dead end portion of the rope may be extended for clinching purposes through these additional openings under the two lengths of rope between the first mentioned openings, the body of said disc having a crown formation on the surface thereof between said first mentioned openings engaged by the abutting lengths of rope, whereby to increase the resistance to slippage of the rope under tension, said body also having a groove provided in the rope-engaged face thereof between the two additional openings, said groove being shallow in relation to the cross-sectional dimensions of the rope.

12. In a device of the character described for securing against slippage the free end of a rope loop, the combination with a rope of substantially uniform thickness having a loop formed in one end portion thereof from which extends a free end portion, a disc body having a pair of diametrically opposed elongated rope-receiving openings extending therethrough in substantially parallel relation and perpendicular to the plane of the body, the openings being tapered toward one another and both being of a width in relation to the thickness of said rope for wedging engagement of side by side abutting live and dead lengths of the rope in the inner ends thereof, said rope being extended through said openings and formed in a loop and its dead end portion being extended back through the openings alongside its live end portion to define the abutting lengths, and the live end being placed under tension while the loop is suitably anchored, said body having two other smaller width diametrically opposed rope-receiving openings extending therethrough in substantially parallel relation and perpendicular to the plane of the body and located on a line in transverse relationship to a line through the first mentioned openings, whereby the dead end portion of the rope may be extended for clinching purposes through these additional openings under the two lengths of rope between the first mentioned openings, the body of said disc having roughnesses on the surface thereof between said first mentioned openings engaged by the abutting lengths of rope, whereby to increase the resistance to slippage of the rope under tension, said body also having a groove provided in the rope-engaged face thereof between the two additional openings, said groove being shallow in relation to the cross-sectional dimensions of the rope.

13. In a device of the character described for securing against slippage the free end of a rope loop, the combination with a rope of substantially uniform thickness having a loop formed in one end portion thereof from which extends a free end portion, a disc body having a pair of diametrically opposed elongated rope-receiving openings extending therethrough in substantially parallel relation and perpendicular to the plane of the body, the openings being tapered toward one another and both being of a width in relation to the thickness of said rope for wedging engagement of side by side abutting live and dead lengths of the rope in the inner ends thereof, said rope being extended through said openings and formed in a loop and its dead end portion being extended back through the openings alongside its live end portion to define the abutting lengths, and the live end being placed under tension while the loop is suitably anchored, said body having two other smaller width diametrically opposed rope-receiving openings extending therethrough in substantially parallel relation and perpendicular to the plane of the body and located on a line in transverse relationship to a line through the first mentioned openings, whereby the dead end portion of the rope may be extended for clinching purposes through these additional openings under the two lengths of rope between the first mentioned openings, the body of said disc having a crown formation on the surface thereof between said first mentioned openings engaged by the abutting lengths of rope, whereby to increase the resistance to slippage of the rope under tension, said two additional openings being also tapered toward one another for wedging engagement of the dead end portion of the rope therein when pulled tight.

14. In a device of the character described for securing against slippage the free end of a rope loop, the combination with a rope of substantially uniform thickness having a loop formed in one end portion thereof from which extends a free end portion, a disc body having a pair of diametrically opposed elongated rope-receiving openings extending therethrough in substantially parallel relation and perpendicular to the plane of the body, the openings being tapered toward one another and both being of a width in relation to the thickness of said rope for wedging engagement of side by side abutting live and dead lengths of the rope in the inner ends thereof, said rope being extended through said openings and formed in a loop and its dead end portion being extended back through the openings alongside its live end portion to define the abutting lengths, and the live end being placed under tension while the loop is suitably anchored, said body having two other smaller width diametrically opposed rope-receiving openings extending therethrough in substantially parallel relation and perpendicular to the plane of the body and located on a line in transverse relationship to a line through the first mentioned openings, whereby the dead end portion of the rope may be extended for clinching purposes through these additional openings under the two lengths of rope between the first mentioned openings, the body of said disc having roughnesses on the surface thereof between said first mentioned openings engaged by the abutting lengths of rope, whereby to increase the resistance to slippage of the rope under tension, said two additional openings being also tapered toward one another for wedging engagement of the dead end portion of the rope therein when pulled tight.

References Cited in the file of this patent

UNITED STATES PATENTS

| 1,011,326 | Deal | Dec. 12, 1911 |
| 1,389,833 | Kent | Sept. 6, 1921 |
| 1,773,545 | Pommer | Aug. 19, 1930 |
| 2,390,584 | Hardin | Dec. 11, 1945 |
| 2,466,083 | Crosby | Apr. 5, 1949 |
| 2,561,371 | Hill | July 24, 1951 |

FOREIGN PATENTS

| 16,022 | Great Britain | 1903 |
| 23,758 | Great Britain | 1902 |
| 515,435 | Germany | 1931 |